United States Patent [19]

Goss et al.

[11] Patent Number: 4,494,186
[45] Date of Patent: Jan. 15, 1985

[54] AUTOMATIC DATA STEERING AND DATA FORMATTING MECHANISM

[75] Inventors: Gary J. Goss, Acton, Mass.; Richard P. Kelly; Thomas L. Murray, Jr., both of Nashua, N.H.

[73] Assignee: Honeywell Information Systems Inc., Waltham, Mass.

[21] Appl. No.: 286,444

[22] Filed: Jul. 24, 1981

Related U.S. Application Data

[63] Continuation of Ser. No. 059,316, Jul. 20, 1979, , which is a continuation of Ser. No. 741,009, Nov. 11, 1976.

[51] Int. Cl.³ .............................................. G06F 3/00
[52] U.S. Cl. .................................................. 364/200
[58] Field of Search ... 364/200 MS File, 900 MS File; 370/43, 79, 91, 95, 99, 89, 102, 112

[56] References Cited

U.S. PATENT DOCUMENTS

| 3,061,192 | 10/1962 | Terzian | 364/200 |
|---|---|---|---|
| 3,618,037 | 11/1971 | Wollum | 364/200 |
| 3,699,525 | 10/1972 | Klavins | 364/200 |
| 3,710,328 | 1/1973 | Hunter et al. | 364/200 |
| 3,754,217 | 8/1973 | Bell et al. | 364/200 |
| 3,842,405 | 10/1974 | Key et al. | 364/200 |
| 3,846,763 | 11/1974 | Rilkonen | 364/200 |
| 3,863,226 | 1/1975 | Ryburn | 364/200 |
| 3,930,232 | 12/1975 | Wallach et al. | 364/200 |
| 3,993,981 | 11/1976 | Cassarino, Jr. et al. | 364/200 |
| 4,012,719 | 3/1977 | Law et al. | 370/99 |
| 4,016,548 | 4/1975 | Law et al. | 364/200 |
| 4,017,839 | 4/1977 | Calle et al. | 364/200 |
| 4,057,847 | 11/1977 | Lowell et al. | 364/200 |
| 4,070,710 | 1/1978 | Sukonick et al. | 364/200 |
| 4,075,691 | 2/1978 | Davis et al. | 364/200 |
| 4,079,452 | 3/1978 | Larson et al. | 364/200 |

Primary Examiner—Gareth D. Shaw
Assistant Examiner—Tim A. Wiens
Attorney, Agent, or Firm—George Grayson; Nicholas Prasinos

[57] ABSTRACT

In a data processing system having a plurality of units coupled for the transfer of information therebetween over a common electrical bus or for transferring information via a communication channel to other data processing systems during asynchronously generated information bus transfer cycles, an apparatus exists for reformatting data for transfer over the common electrical bus or via the communication channel. The apparatus is comprised of an eight-way multiplexer responsive to control bits for selecting one of eight different formats during write or read operations to or from a memory. Additionally, during read operations, the apparatus transfers a return address from a unit requesting information to the address bus so that data read from memory may be transferred to the requesting device. The formatting control bit is similarly reformatted from the data bus to the address bus bit.

5 Claims, 21 Drawing Figures

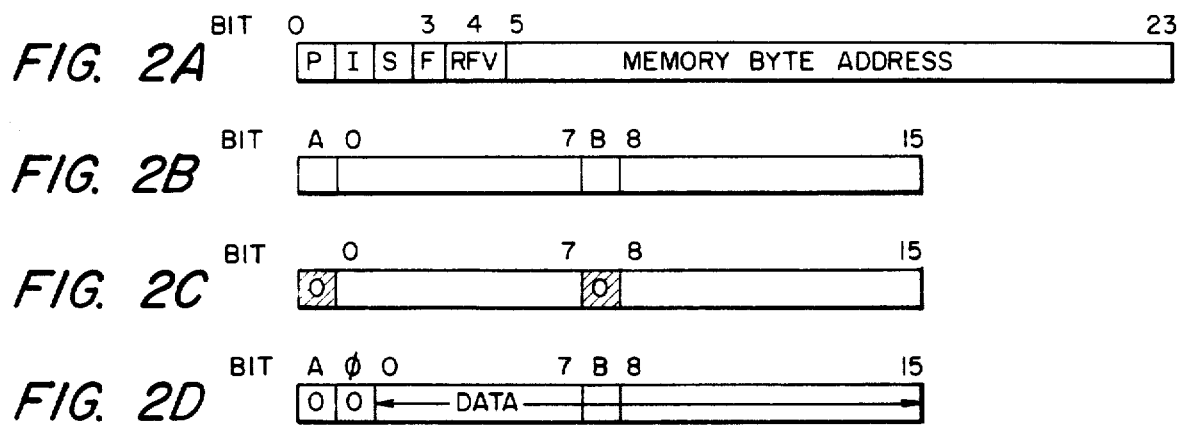
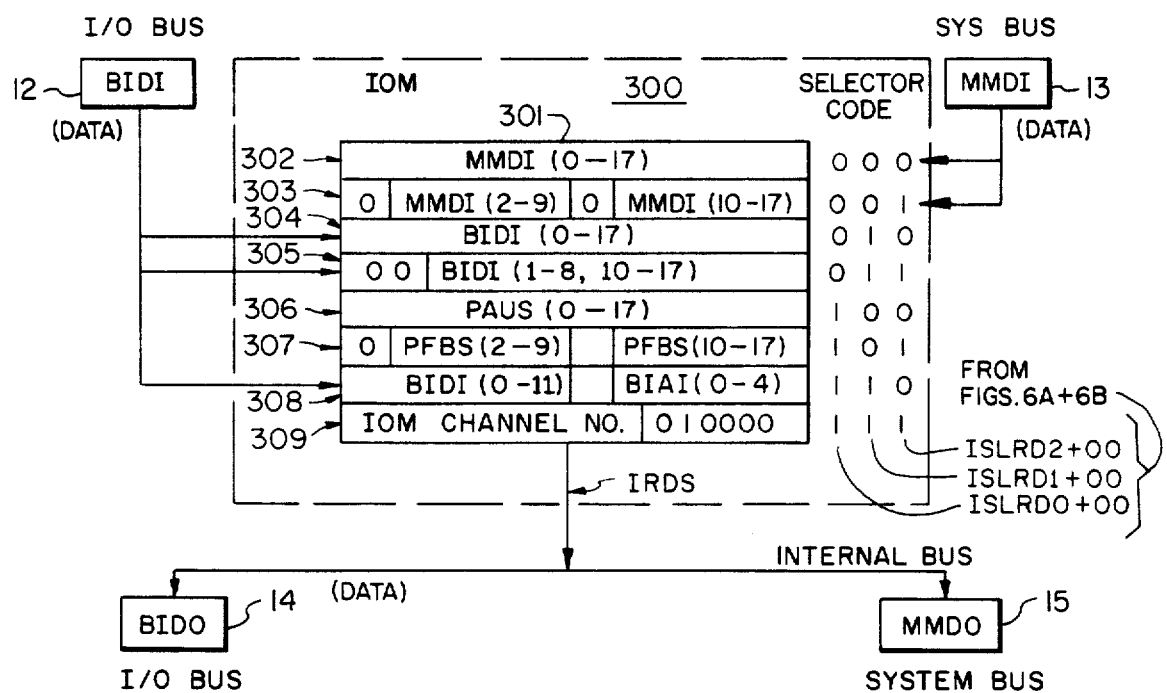
FIG. 3

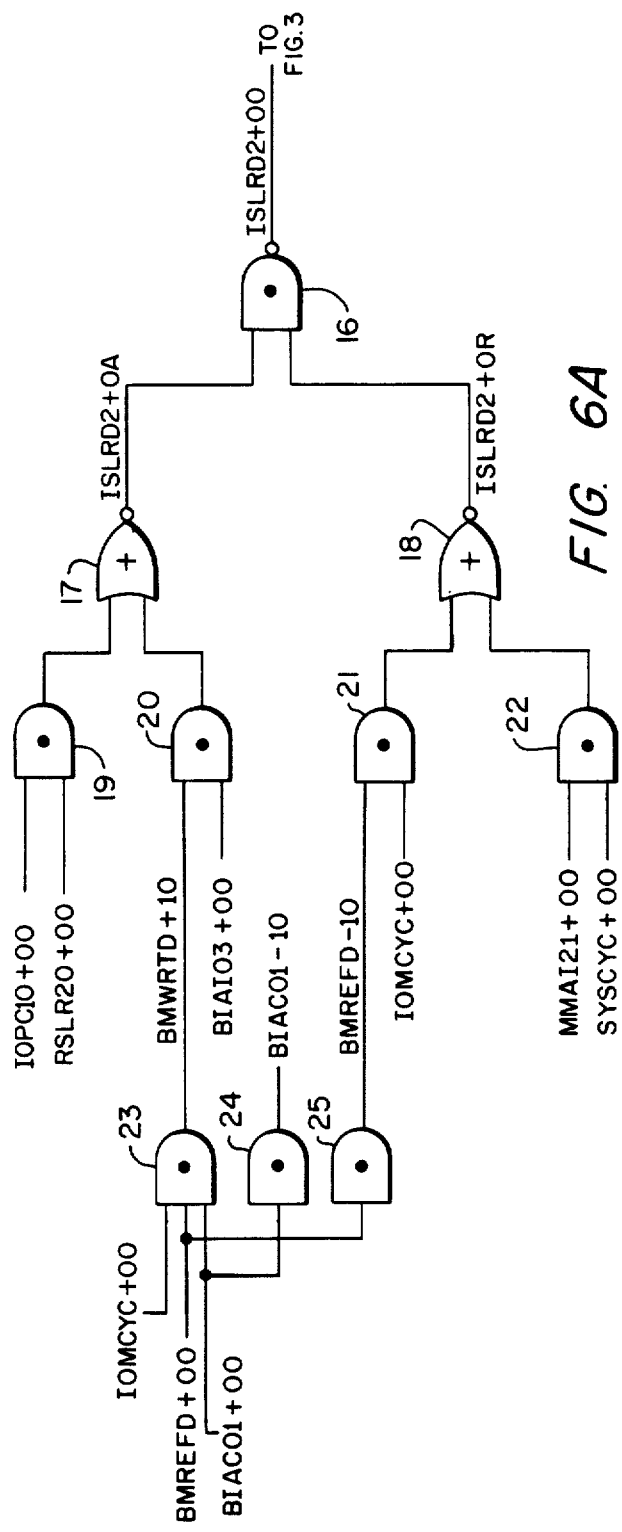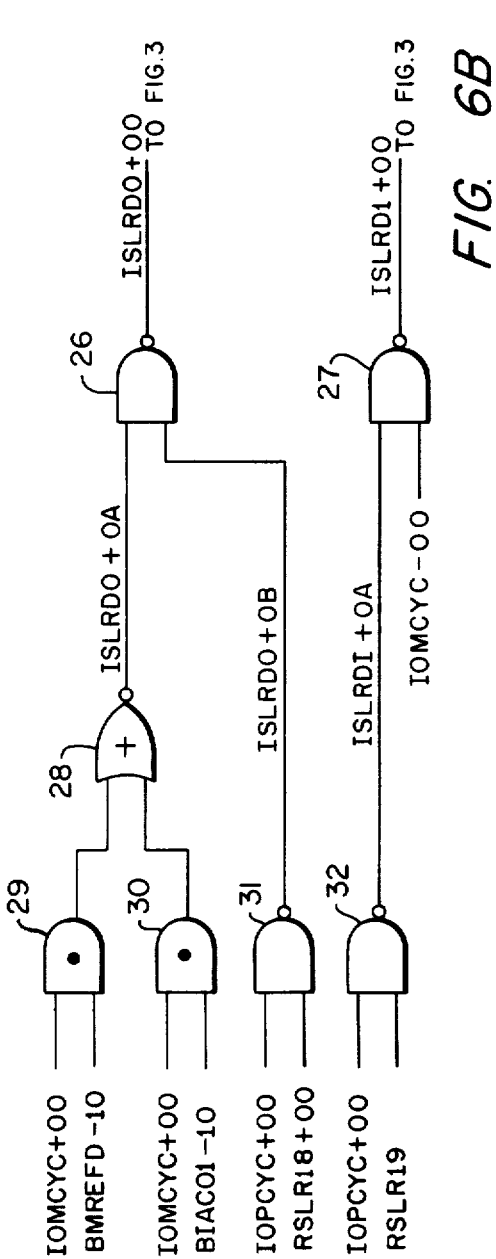
FIG. 6A
FIG. 6B

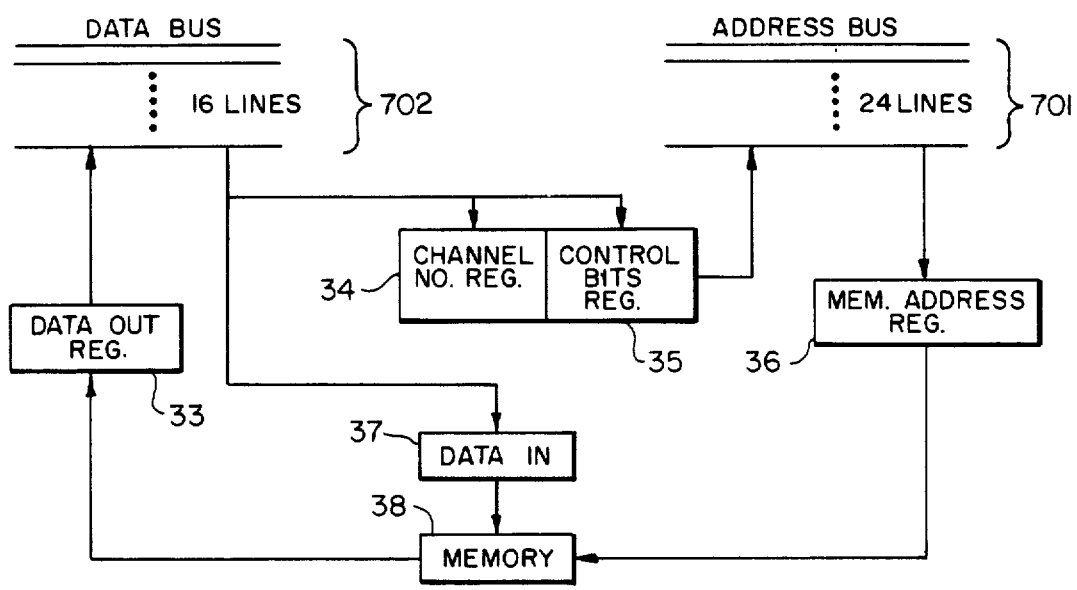
FIG. 7
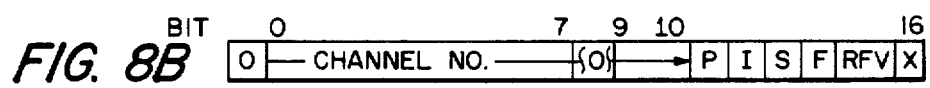
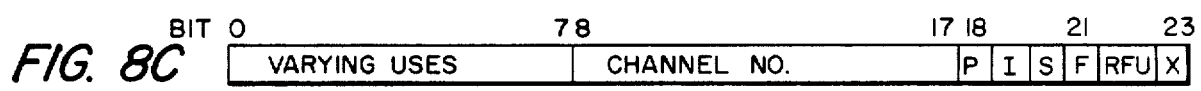

AUTOMATIC DATA STEERING AND DATA FORMATTING MECHANISM

This application is a continuation of application Ser. No. 059,316, filed 7/20/79, which is a continuation of application Ser. No. 741,009, filed 11/11/76.

BACKGROUND OF THE INVENTION

1. Field of the Invention

This invention relates to data processing systems and more particularly to data processing operations requiring the transfer of information over a common input/output bus or via a communication channel wherein information is transferred from one data processing system to another.

2. Description of the Prior Art

Various methods and apparatus are known in the prior art for transferring information from one computer system to another computer system or from one device in a given computer system to another device in the same computer system over a common input/output bus. Most prior art devices in transferring such information require the action of the central processing unit as an intermediary and communicate to other units via the central processing unit (CPU). More advanced means for communication within a system or between systems provide for direct communication from one unit to the other unit without the intervention of the central processing unit (CPU). One such system is disclosed in U.S. patent application Ser. No. 591,964, filed on June 30, 1975 and entitled, "Apparatus for Processing Data Transfer Requests in a Data Processing System" which is assigned to the same assignee as the instant application and which issued into U.S. Pat. No. 3,993,981 on Nov. 23, 1976 and is hereby incorporated by reference to the instant application. That system provides for a plurality of devices coupled over a common bus whereby bidirectional transfer of information may be provided between such devices coupled to the bus such as one or more data processors, one or more memory units, various types of peripheral devices, such as magnetic tape storage devices, disk storage devices, card reading equipment and the like. Additionally, a data processing system utilizing a common bus is shown in U.S. Pat. No. 3,815,099.

Communication of computer systems with each other is described in a book entitled "Communication Networks for Computers", by D. W. Davies and D. L. A. Barbour published in 1973 by John Wiley and Sons of New York, N.Y. One problem when computer systems communicate with each other or when devices within a computer system communicate with each other surfaces when words of different lengths or different formats are utilized by each system or device. For example, in the instant invention, bidirectional transfer of information from an NML controller is attached to an HNP bus whereby the NML controller handles sixteen bit words and the HNP bus handles eighteen bit words. Furthermore, in many instances, the HNP memory requires that words stored therein be right-justified within sixteen contiguous bits comprised of 2 eight-bit words and an A bit (the first bit from the left) and a B bit (the ninth bit from the left) filling in the high order end of the word. Although, in this instance, the two words are eighteen bit and sixteen bit lengths, the words may typically be of any other length and would give rise to the same problem.

Another problem which presents itself in the bidirectional transfer of information arises when a source unit requests a read operation be performed in any one of a number of memories at an address provided by the source unit. Since there are many devices attached to a common bus system, main memory must have some means for identifying the source unit in order to return the information to the proper device.

OBJECTS OF THE INVENTION

It is an object of the invention to provide an improved system of bidirectional transfer of information from one computer system to another or from one device to another device in the same computer system.

It is another object of the invention to provide an apparatus for automatically reformatting data.

It is still another object of the invention to provide an improved transfer of information over a common electrical bus.

It is still another object of the invention to provide improved communication between a unit requesting information and a unit providing that information.

A further object of the invention is to make the transfer means "transparent" to the NML controller so that no hardware or firmware changes are required in it.

These and other objects of the invention will become obvious upon a reading of the specification together with the drawings.

SUMMARY OF THE INVENTION

In accordance with the above and other objects of the invention, an apparatus is provided to select one of eight different formats. The apparatus comprises an eight-way multiplexer responsive to control bits for selecting one of a plurality of formats. Signals are generated by logic circuitry which is responsive to various signals indicative of the state or desires of various devices requesting or receiving information.

BRIEF DESCRIPTION OF THE DRAWINGS

The manner in which the apparatus of the present invention is constructed and its mode of operation can best be understood in the light of the following detailed description, together with the accompanying drawings, in which:

FIGS. 2A–2D illustrate the format of various information transferred over the bus system of FIG. 2.

FIG. 3 is a general block diagram illustration of the present invention.

FIGS. 6A and 6B are the logic block diagrams of the present invention.

FIG. 7 is a block diagram illustrating the transfer of the device address information from the data bus to the address bus.

FIGS. 8A–8D illustrate the format of various information during a read cycle of the invention.

DETAILED DESCRIPTION OF THE PREFERRED EMBODIMENT

Figure 1:
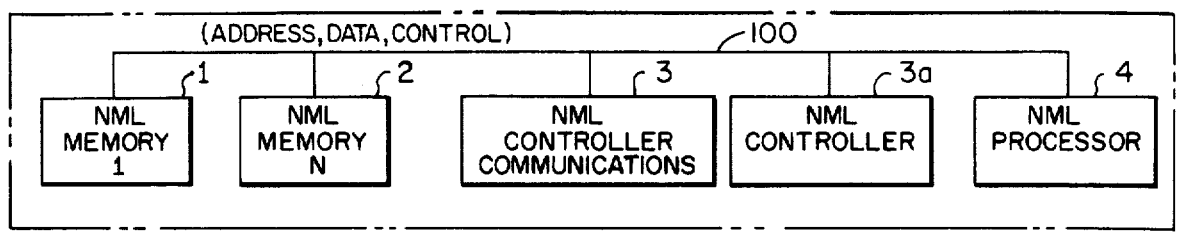
FIG. 1 is a general block diagram for one type of communication bus utilized by the invention.
Figure 1A:
FIGS. 1A and 1B illustrate the format of the address bus and data bus of the bus system of FIG. 1.

The data processing bus of the present invention provides a communication path between two units in a given system. FIG. 1 illustrates one type of bus wherein the controllers are coupled on the same bus as the memories and the processors. The bus utilizes twenty-four bits for addressing and sixteen bits for data. This type of bus is described in detail in the above-referenced allowed U.S. patent application Ser. No. 591,964, filed June 30, 1975 and issued into U.S. Pat. No. 3,993,981 on Nov. 23, 1976 and assigned to the same assignee as the instant application and included herein by reference. It should be noted that FIG. 1 of the referenced application includes more devices attached to the bus than shown on FIG. 1 of the instant application. It should be understood, however, that any number of devices up to the maximum for which the bus was designed may be coupled to the bus.

Figure 2:
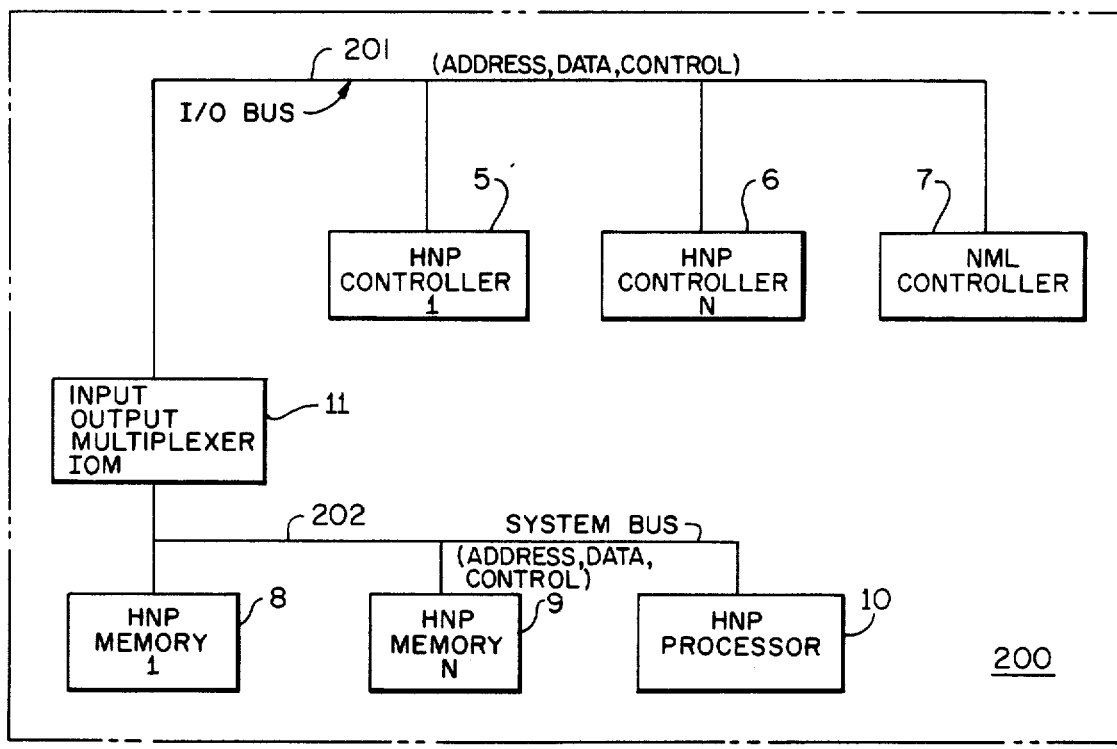
FIG. 2 is a general block diagram of another type of bus utilized by the invention.

Another bus is illustrated in FIG. 2 wherein the basic bus system is divided into two buses, an I/O bus and a system bus separated by an input/output multiplexer (IOM). In this type of bus system, the I/O bus is coupled to all the I/O controllers whereas the system bus is coupled to the memories and processors. The word format of the bus system of FIG. 2 is shown in FIGS. 2A-2D wherein FIG. 2A is the address portion of the bus and FIGS. 2B and 2D are data formats. Although a few typical controllers are shown coupled to the I/O bus, it is designed to have up to 46 connectible units. However, the number of I/O devices supported on a single I/O bus may be greater than this number because many of the units support several I/O devices at the same time. Similarly, although two memory devices and one processor are shown connected to the system bus of FIG. 2, several such units may be connected up to their maximum allowable for any system, including subsets of memory such as cache memory, pages, etc.

A main feature of these types of buses is that communication may be established directly between units on a bus such as, for example, between NML memory 1 and NML controller 3 (FIG. 1), or between HNP controller 5 and HNP memory 9 (FIG. 2) without any intervention from a central processing unit. Generally, in this type of communication between devices which handle words of different lengths or different formats, the instant invention is utilized to change words from one format to the other so that the device processing the information can utilize it.

Referring to FIG. 1 and to the above-referenced U.S. Pat. No. 3,993,981, a typical NML bus system includes a multi-line bus 100 coupled with an NML memory 1 and an NML memory 2. Also, on the same bus 100 there is shown a typical NML controller for communications 3, a typical NML controller 3a and an NML processor 4. Also connected on the bus 100 may be included, for example, a scientific arithmetic unit and various controllers which in turn are themselves coupled to control other peripheral devices such as unit record or tape peripheral devices. NML controller 3 may be used to provide communications control via modem devices. (See above referenced U.S. Pat. No. 3,993,981).

Referring now to FIG. 2, the HNP bus system 200 is shown with some typical units connected thereto. It should be understood that according to the design many units beyond those shown can be coupled thereto, although for the purposes of disclosing this invention the typical units shown herein suffice. The HNP bus system 200 is comprised of the I/O bus 201 and the system bus 202. As previously noted, the controllers are coupled to the I/O bus 201 such as HNP controllers 1 through N, 5, 6 and NML controller 7. On the system portion of the bus 202, typical HNP memories 1 through N, 8, 9 and typical HNP processor 10 are coupled. Also coupled to the system bus 202 may be, for example, a scientific arithmetic unit (not shown) and various peripheral devices such as mass storage devices, tape devices, and unit record devices (also not shown). The input/output multiplexer (IOM) 11 provides a path for data and control information between components attached to the HNP system bus 202 such as the main storage units or the central processors and the I/O controller (sometimes referred herein as channels) attached to the HNP I/O bus 201.

The IOM 11 consists of four major units—the input/output bus interface, the system bus interface, a data pump, and an I/O processor. However, since these units are not necessary to an understanding of the instant invention, only that portion of the IOM shown in FIGS. 3, 6A and 6B which is necessary to an understanding of the invention is shown and described.

The HNP bus system 200 permits any two units in the system to communicate with each other. Any unit wishing to communicate requests a bus cycle (see FIG. 5) described further infra. When that bus cycle is granted, that unit (the source) may address any other unit (the destination) on the bus. Information transfers during that specific bus cycle are in one direction only which is from source to destination. Some types of bus interchange require a response (read memory, for example). In that case, the requestor indicates that a response is required and identifies itself. When the required information is available, the original destination becomes the source for an additional bus cycle which supplies the information to the requesting unit. This completes the interchange which has taken two bus cycles in this case. Intervening time on the bus between these two cycles may be used for other additional systems traffic.

A source may address any other unit on the bus as a destination. The address of each unit is identified by a channel number with the exception of the memory type units which are identified by their memory address. A channel number is assigned for each such device. Full duplex devices as well as half duplex devices may utilize two channel numbers; some HNP full duplex channels, however, require only one number. Output only or input only devices use only one channel number each. Channel numbers are usually variable and accordingly one or more hexadecimal rotary switches (thumbwheel switch) may be utilized for each such unit connected with the bus to indicate or set the unit address. Thus, when a system is configured, the channel number may be designated for the particular unit connected to the bus as may be appropriate for the particular system. Units with multiple input/output (I/O) ports generally require a block of consecutive channel numbers. By way of example, a four port unit may use rotary switches to assign the upper seven bits of a channel number and may use the lower order three bits thereof to define the port number to distinguish input ports from output ports. A source (sometimes called a master unit in this application) addresses a destination (sometimes called a slave unit in this application) by placing a destination address on the address leads of the address bus. There are 24 address leads which can have either of two interpretations depending on the state of an accompanying control lead, called memory reference (BSMREF−). When a master unit is addressing a slave unit and that slave unit is a memory, the format of FIG. 2A is utilized for the address word. This is indicated by having the memory reference signal BSMREF true. However, when the master unit is addressing a slave unit which is not a memory, then the memory reference signal BSMREF is false and the address format of FIG. 8C is utilized.

When a source or master unit requires a response from the destination or slave unit such as in a read operation, it indicates this to the destination by a control bit signal named Response Pequired (BSRSVP+). In addition, the source provides its own identity to the destination by providing its channel number comprising generally ten bits on the data bus along with the address on the address bus; additional control information is also provided on the data bus on the lowest order six bits. When a response is required, therefore, by a source from a destination, the address is provided on the address bus and will take have the format of FIG. 2A or FIG. 8C depending on the type of destination being addressed—memory being addressed by the format of FIG. 2A and other type units by the format of FIG. 8C. Moreover, then a response is required from the destination being addressed, the source additionally provides its own address, i.e., channel number on the first high order ten bits of the data bus and also provides control information on the six low order bits of the address bus. This latter operation is provided in two bus cycles.

Figure 1B:
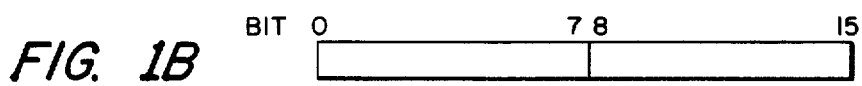
Figure 4:
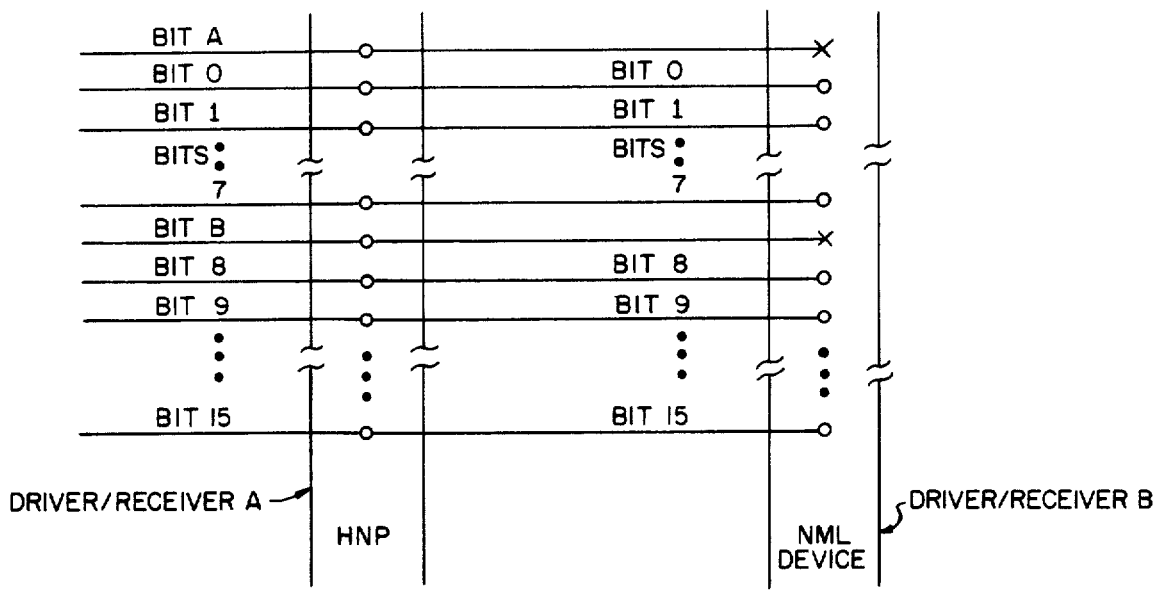
FIG. 4 is the wiring connection of driver/receiver pairs for transforming from the format of FIG. 1B to the format of FIG. 2C.

Referring now to FIGS. 2A–2D, there is shown some typical address and data formats of the HNP bus system 200. The first five bits of the address format of FIG. 2A include the P, I, S, F and RFV bits. The only bit directly involved in the operation of the invention is the F bit or format bit. This bit will be described in greater detail infra. Bits 5 through 23 are utilized to address a memory location. FIG. 2B illustrates the way the data is formatted on the data bus of the HNP bus system. It was previously shown that the data bus format of the NML bus system of FIG. 1 has the format of FIG. 1B; that is, there are two contiguous bytes with each byte consisting of eight bits each. The format of FIG. 2B, on the other hand, has eighteen bits with an A bit on the high order side, a B bit between bits seven and eight, and 2-eight bit bytes comprised of bits 0–7 and bits 8–15. The format of FIG. 2C is utilized when data from the NML bus having the format of FIG. 1B is to be utilized as data in the HNP bus. Since the HNP bus has a data format as shown on FIG. 2B comprising a total of eighteen bits, the data of the NML bus with a format of FIG. 1B must be realigned to a format as shown on FIG. 2C. This format has a zero in the highest bit position and also another zero between bits 7 and 8. Accordingly, bits 0–7 of FIG. 1B occupy bits 0–7 of FIG. 2C and bits 8–15 of FIG. 1B occupy bits 8–15 of FIG. 2C. This transformation is easily accomplished as shown with the device of FIG. 4. Referring to FIG. 4, there is shown connections for driver/receiver A and driver/receiver B. Driver/receiver A has connections for bits in accordance with the format of FIG. 2C, while driver/receiver B has connections in accordance with the format of FIG. 1B. It will be seen that the A and B bits of driver/receiver A are coupled to an X terminal on driver/receiver B. The X indicates that that position is always zero. Hence, with this simple interconnection, formats of FIG. 1B may be transformed to formats of FIG. 2C and vice versa.

FIG. 2D illustrates still another word format utilized by the HNP bus system 200 when storing certain types of information into the memory unit connected to that bus. In that format, the A and B bits occupy the two high order bit positions with 2 eight-bit bytes being stored contiguously in the remaining low order bit positions.

As previously noted, the formats of FIGS. 8A–8D are utilized when a source addresses a destination and expects a reply. As previously noted, FIGS. 8A and 8C illustrate the formats of the address bus data when the source is addressing a memory type device and any other type device respectively. FIG. 8B is the format of the data bus data when such a source is addressing a destination and is expecting an answer, and hence is providing its own address (i.e., the channel number) on the data bus. Referring to FIG. 8A, bits 0 through 23 may be utilized for addressing a particular word in memory. An alternative format is shown in FIG. 2A where a smaller memory is being addressed and the high order bits are utilized as control information. Referring to FIG. 8C, the first eight bits may be utilized for varying uses. Bits 8 through 17 are the channel number of the destination being addressed, whereas bits 18 through 23 are control bits. The only control bit essential to the practice of this invention is the F bit at bit position 21 which will be further described infra. Referring to FIG. 8D, one data format of an HNP memory is shown and includes the A and B bits in the high order bit positions with 2 eight-bit bytes in the low order positions. FIG. 8D and FIG. 2D are similar; however, the format has also been included in this second grouping because it will facilitate the explanation of a read cycle to be later more fully discussed.

Referring now to FIG. 3, there is shown a general block diagram of the system of the invention. The IOM 300 which is the same as IOM 11 in FIG. 2, includes the logic circuits of FIGS. 6A–6B. The logic circuits of FIGS. 6A and 6B are responsive to signals shown therein and generate selector codes for selecting any of the formats shown in the block representing multiplexer 301. The formats of interest to this invention are as follows: (a) MMDI (0–17) 302; (b) MMDI (2–9) (10–17) 303; (c) BIDI (0–17) 304; (d) BIDI (1–8) (10–17) 305; and (e) BIDI (0–11), BIAI (0–4) 308. One of these formats is selected when the appropriate selector code is applied to the multiplexor 301 consists of individual 8 into 1 multiplexers which are. (The multiplexer 300 is commercially available from Texas Instruments Corporation of Dallas, Tex. off the 74 S151TI type). Since the NML bus is an eighteen bit system, eighteen of these 8 into 1 multiplexers are required. However, it should be understood that the basic principle is applicable to any number of bits and accordingly a smaller or greater number of multiplexers may be utilized.

The selector code is generated by the apparatus of FIGS. 6A and 6B. Referring to FIG. 6A and 6B, there are shown NAND gates 26, 27 and 16 which generate the signals ISLRD0+00, ISLRD1+00, and ISLRD2+00, respectively. These same signals form the selection code shown on the right hand edge of the block labelled IOM 300 of FIG. 3. In order to select, for example, BIDI (1-8, 10-17) 305, the code 011 must be generated. This means that the signal ISLRD0+00 must be low or binary zero, whereas signals ISLRD1+00 and ISLRD2+00 must be high or binary one. Hence, referring to FIGS. 6A and 6B, NAND gate 26 must provide a low or a binary zero signal and NAND gates 27 and 16, respectively, must provide high or binary one signals. In order for NAND gate 26 to be low, both input signals to NAND gate 26, ISLRD+0A and ISLRD0+0B, must be high. The ISLRD0+0A signal is the signal that controls the placing of I/O bus data on the system data bus (when logic one); or the placing of channel number and format control bits of the data bus (when logic zero); and the ISLPD0+0B is the signal used only by the IOM processor (not shown) when it is reading or writing the external I/O or system bus. In order for the ISLRD0+0B signal to be high, at least one input signal to NAND gate 31 must be low such as the IOPCYC+00 signal or RSLR18+00 signal. The IOPCYC+00 signal is low if the IOM processor (not shown) within the IOM is not accessing an external I/O bus or system bus; it is high if the IOM processor is accessing an external I/O or system bus. Similarly, the RSLR18+00 signal is utilized to indicate that the IOM processor (not shown) is accessing a bus when it is high.

In addition to input signal ISLRD0+0B being high, the input signal ISLRD0+0A to NAND gate 26 must also be high in order to have output signal ISLRD0+00 low. The ISLRD0+0A signal will be high when both input signals to NOR gate 28 are low. Both input signals through NOR gate 28 will be low when the output signals from AND gates 29 and 30, respectively, are also low. The output signals from AND gates 29 and 30 will be low when at least one of the input sigals to each of AND gates 29 and 30 is low. Accordingly; input signal IOMCYC+00 or input signal BMREFD−10 to AND gate 29 must be low or both must be low for a low output signal on AND gate 29. Similarly, input signal IOMCYC+00 and input signal BIAC01−10 to AND gate 30 or both must be low for a low output signal from AND gate 30. Signal IOMCYC+00 is low when a transfer from the I/O bus 201 to the system bus 202 is not taking place. Signal BMREFD−10 is low when a direct memory reference from the I/O bus 201 to any memory module 8 or 9 on the system bus 202 is not taking place. Similarly, the IOMCYC+00 signal on AND gate 30 may be low as previously described; and signal BIAC01−10 will be high when a response cycle is not required of the system bus. With these conditions met, a low output signal will be generated on NAND gate 26. This represents the high order bit of the selector code which for this example is a binary zero. The next highmost order bit of the selector code is provided at the output of NAND gate 27 as signal ISLRD1+00. For this same example, it is required that this signal be high. This signal will be high when either input signal ISLRDI+0A or IOMCYC−00 to NAND gate 27 or both are low. The ISLRD1+0A signal is low when the IOM processor (not shown) is reading I/O bus 201. The IOMCYC+00 signal is low when no transfer from the I/O bus 201 to the system bus 202 is taking place, and conversely it is high when a transfer from the I/O bus to the system bus is taking place. One input signal to NAND gate 27 is low when the output signal of NAND gate 32 is also low, and this is low when either or both of the input signals to NAND gate 32 are high. The input signal IOPCYC+00 to NAND gate 32 is high if an IOM processor (not shown) within the IOM is accessing an external I/O or system bus; and conversely, it is low if the IOM processor (not shown) in the IOM is accessing an external I/O or system bus. The RSLR19+00 signal is high when the IOM processor (not shown) is accessing the I/O bus; and conversely, it is low when an IOM processor is accessing the system bus. Accordingly it has been shown how the nextmost high order bit of the selector code is generated. Finally, to generate the lowest order bit of the selector code, NAND gate 16 must be high for this particular example where we are selecting element 305 having selector code 011.

Output signal ISLRD2+00 on NAND gate 16 is high when either or both of its input signals are low. Accordingly, output signals from NOR gates 17 and 18 must either be both low or at least one low for this particular example. Output signal ISLRD2+0A from NOR gate 17 is low when either or both of its input signals are high. High input signals to NOR gate 17 are applied when high output signals result from AND gates 19 and 20. A high output signal will result from AND gate 19 when both input signals are high. Similarly, a high output signal will result from AND gate 20 when both its input signals are high. The IOPCYC+00 signal is high when the IOM processor is accessing an external I/O or system bus register (not shown). The RSLR20+00 signal is high when the IOM processor is reading the external I/O or system bus registers (not shown). Similarly, input signal BMWRTD+10 is high when there is a direct memory write operation from the I/O bus 201 to the memory on the system bus 202. This high signal is generated when the output of AND gate 23 is high, and accordingly all input signals to AND gate 23 must also be high. Input signal IOMCYC+00 is high if a transfer from the I/O bus 201 to the system bus 202 is taking place. Input signal BMREFD+00 is high if a transfer of information is taking place from the I/O bus 201 to any memory 8 or 9 on the system bus 202. The input signal BIAC01+00 is high when a response cycle is not required (e.g., writing memory by the I/O bus). With these conditions true, a high signal ISLRD2+00 will be generated and this will be the low order bit of the three bit selector code. A high output signal ISLRD2+00 from NAND gate 16 may be similarly selected utilizing the same reasoning by following the alternate path utilizing AND gates 25, 21 and 22 and NOR gate 15. Table I below identifies the various signals utilized by FIGS. 6A and 6B and also their function. Accordingly, any person of ordinary skill in the art may construct the apparatus to generate the selector code signals to select a predetermined format required.

TABLE I

| Signal Name | Source of Signal | Destination of Signal | Function of Signal |
|---|---|---|---|
| IOMCYC+00 | I/O Bus Interface | Internal Bus | High if a transfer of information from I/O bus |

TABLE I-continued

| Signal Name | Source of Signal | Destination of Signal | Function of Signal |
| --- | --- | --- | --- |
| | | | to system bus is taking place. |
| BMREFD+00 | I/O Bus Interface | Internal Bus | High if information from an I/O bus to a memory module on the system bus is taking place. |
| BIACO1+00 | I/O Bus | System Bus | High when a response cycle is not required of the system bus. |
| IOPCYC+00 | IOM Processor | Internal Bus | High if an IOM processor is accessing an external I/O or system bus. |
| RSLR18+00 | IOM Processor | Internal Bus | A read operation on storage bit 18 only used when IOM processor is accessing a bus |
| RSLR19+00 | IOM Processor | Internal Bus | Read operation on storage bit 19 only when IOM processor is accessing a bus. |
| RSLR20+00 | IOM Processor | Internal Bus | Read only storage bit 20 when IOM process or is accessing a bus. |
| BMWRTD+10 | I/O Bus Interface | Internal Bus | Direct memory write from I/O bus to system bus. |
| BIAIO3+00 | I/O Bus | System Bus | The format bit on the I/O bus which indicates reformatting must take place when it is = 1 with write select 305 (FIG. 3). = 0 with write select 304 (FIG. 3). = X with read select 308 (FIG. 3). |
| MMAI21+00 | System Bus | I/O Bus | Format bit from memory on BSSHBC when: = 1 and SHBC code is 303. = 0 and SHBC code is 302. |
| SYSCYC+00 | System Bus Interface | Internal Bus | System bus to I/O bus transfer. |
| ISLRD0+0A | I/O Bus Interface | Internal Bus | |
| ISLRD0+0B | IOM Processor | Internal Bus | |
| ISLRD1+0A | IOM Processor | Internal Bus | |
| ISLRD1+00 | Internal Bus | Internal Bus | Signal for the high order bit of the selector code. |
| ISLRD1+00 | Internal Bus | Internal Bus | Signal for the middle order bit of the selection code. |
| ISLRD2+00 | Internal Bus | Internal Bus | Signal for the low order bit of the selection code. |

It can be readily seen from the previous discussion that requests for data from another unit or for transfer of data, etc., are made via issuing predetermined signals. Combinations of these signals automatically generate a code which is utilized to select the proper format for the particular operation being performed or requested. Data comes in from the I/O data bus 12 (FIG. 3) together with the BIDI signals, whereas it comes in from the system bus 13 together with the MMDI signals. Normally, transfer operations involve information being transferred from the I/O data bus 12 to the system bus 15 taking a diagonal path across FIG. 3 through the multiplexer 30. During this diagonal path, any one of the different configurations of the multiplexor 301 of IOM 300 may be selected. In FIG. 3 there is also shown an internal IRDS bus which is part of the IOM 300 and interfaces with the multiplexer 301 and the I/O bus 14 and system bus 15. Accordingly, a transfer from the I/O bus 12 to the system bus 15 will include in its path the IOM 300, the multiplexer 301 and the IRDS bus. Information may also be transferred from the system bus 13 which comes into the IOM together with the MMDI signals to the I/O bus 14 which accepts information from the IOM and the BID0 signal. Once again the internal bus IRDS is utilized in the path. However, for the purposes of this invention, the IRDS bus may be regarded as an intermediary passive transfer agent or conduit and can be disregarded.

Figure 5:
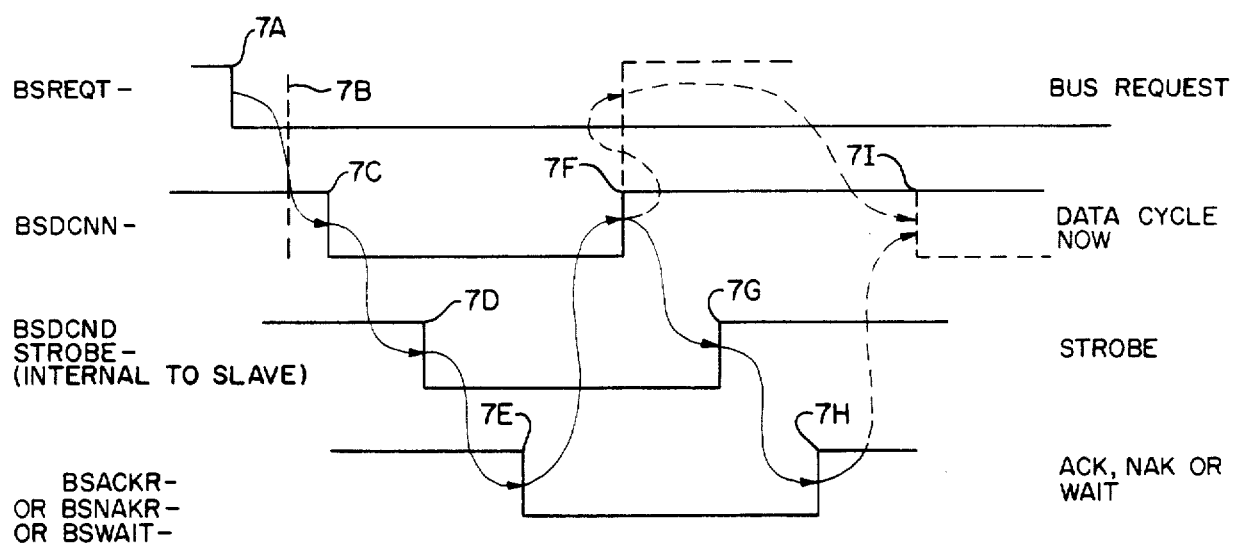
FIG. 5 is an illustration of a timing diagram of the operation of the bus of the present invention.

Referring now to FIG. 5, the timing diagrams of the HNP bus system will be discussed in detail. In every bus cycle there are three identifiable parts; more particularly, the period (7-A to 7-C) during which the highest priority requesting device wins the bus, the period (7-C to 7-E) during which the master unit calls a slave unit, and the period (7-E to 7-G) during which the slave responds. When the bus is idle, the bus request signal (BSREQT−) is a binary one. The bus request signal's negative going edge at time 7-A starts a priority net cycle. There is an asynchronous delay allowed within the system for the priority net to settle (at time 7-B) and a master user of the bus to be selected. The referenced U.S. Pat. No. 3,993,981 discloses the generation of the bus request signal BSREQT− in column 10, lines 35-47. Referring to FIG. 8, thus, with the bus in the idle state, the first event that occurs as the bus goes to the busy state is that the user sets its user request flip-flop 15. When both inputs to gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. The binary ONE state of the MYREQT— signal will be placed on line 10 of the bus via driver 18 (BSREQT—) as a binary ZERO. The next signal on the bus is the BSDCNN— or data cycle now. The BSDCNN— signal's transition to a binary zero at time 7-C means that use of the bus has been granted to a master unit. Thereafter, the second phase of bus operation means the master has been selected and is now free to transfer information on the data, address and control leads of the bus system 200 to a slave unit that the master designates. The referenced U.S. Pat. No. 3,993,981 discloses the generation of the BSDCNN— signal in column 11, lines 53-56, 58-59. Referring to FIG. 8, if grant flip-flop 22 has been set, the Q output signal is a binary ONE and will be inverted to a binary ZERO signal by inverter 23 and will than be placed on the bus on signal line BSDCNN—. Thus, the priority cycle of the bus cycle is completed.

The slave unit prepares to initiate the third phase of the bus operation beginning at the negative going edge 7D of the strobe or BSDCND— signal. The strobe signal is delayed, for example, 60 nanoseconds from the negative going edge 7C of the BSDCNN— signal via a delay line (not shown). Upon the occurrence of the negative going edge of the BSDCND— signal at time 7-D, the slave unit can now test to see if this is his address and if he is being called to start the decision making process of what response it is required to generate. The referenced U.S. Pat. No. 3,993,981 discloses the generation of the BSDCND+ strobe signal from column 12, lines 9-36. Referring to FIG. 8, having completed a priority cycle and having now caused a binary ZERO state to be placed on the BSDCNN— line, the signal is received by all such logic as shown in FIG. 8 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus at the end of the delay line period established by delay line 25, the strobe (BSDCND+) signal is generated, the inversion of which, i.e., the BSDCND— signal is shown in the timing diagram of FIG. 7. Typically this will cause an acknowledge signal 7E (BSACKR—) to be generated by the slave unit or in the non-typical cases a BSNAKR— or BSWAIT— signal or even no response at all (for the case of a non-existent slave) may be generated as herein described. The negative going edge of the acknowledge signal at time 7-E when received by the master unit causes the master's BSDCNN— signal to go to a binary one at time 7-F. The strobe signal returns to the binary one state at time 7-G, which is a delay provided by a delay line (not shown) from time 7-F. Thus, in the third phase of bus operation, the data and address on the bus are stored by the slave unit and the bus cycle will begin to turn off. The ending of the cycle, i.e., when BSDCNN— goes to a binary one, dynamically enables another priority net resolution. A bus request signal may at this time be generated and, if not received, this means that the bus will return to the idle state, and accordingly the BSREQT— signal would go to the binary one state. If the bus request signal is present at that time, i.e., a binary zero as shown, it will start the asynchronous priority net selection process following which another negative going edge of the BSDCNN— signal will be enabled as shown by the dotted lines at time 7-I. It should be noted that this priority net resolution need not wait or be triggered by the positive going edge of the acknowledge signal at time 7-H, but may in fact be triggered at time 7-F just following the transition of the bus to an idle state if thereafter a unit desires a bus cycle. This process repeats in an asynchronous manner. The information which is transferred by this type of bus cycle may include 51 signals which break down as follows:

(a) 24 address bits;
(b) 16 data bits;
(c) 6 control bits;
(d) 5 integrity bits.

Some types of data transfers such as a read cycle require that a response be made by the destination unit back to the source. Accordingly, two bus cycles are necessary for this type of data transfer operation. However, a problem arises when data having one type of format on a source unit is to be transferred to a destination unit which in turn has another type of format. The data of NML controller 3a having the format of FIG. 1B is transformed when accepted by NML controller 7 to a data format shown on FIG. 2C. When a write operation is requested by NML controller 7 of HNP memory 8, the data format shown in FIG. 2C must be transformed (in many instances) to the format shown in FIG. 2D. This is done in accordance with the operation of the invention as previously described on FIGS. 3, 6A and 6B. An additional problem is now created when, for example, HNP controller 5 requests a read cycle to be made on HNP memory 8, because during the first or requesting cycle, a return address must be provided by source unit HNP controller 5 in order to receive back the information read out of destination unit HNP memory 8.

Referring therefore to FIGS. 7 and 8A-8D, a source unit on I/O Bus 201 requiring a memory readout provides a memory address on the Address Bus 701. This memory address has the format of FIG. 8A or 2A, depending in connection with the size of the memory. At the same time the requesting or source unit on the I/O Bus 201 of FIG. 2 provides its address, i.e., channel number and some control bits on the Data Bus 702. The information has the format shown on FIG. 8B. The memory address from Address Bus 701 is stored in Memory Address Register 36 while the channel number and control bits are stored in Channel Register 34 and Control Bit Register 35. The memory location in memory 38 addressed by Memory Address Register 36 is read out and the data stored in Data Out Register 33. The data is then placed on the data bus when the necessary timing (see FIG. 5) to complete the handshake operation of the data bus is complete, and a requesting unit now transformed into the receiving unit acknowledges that it is ready to receive the data; the second bus cycle begins and the data from Data Out Register 33 is placed on data bus 702 and at the same time the channel number and control bits from registers 34 and 35 are placed on Address Bus 701 in accordance to the format of FIG. 8C. (It should be noted now that this is the address format when addressing a unit other than a memory unit). Accordingly, the address, i.e., channel number, is placed on the Address Bus 701 on bit positions 9-17 whereas the control bits are placed on the Address Bus 701 on bit positions 18-23. However, as previously mentioned, the only bit of interest to this invention is bit 21 which is the formatting bit. This is recognized by the logic circuitry of FIG. 6A as signal MMA121+00. When this bit is true, reformatting of the data is required and the type of reformatting will depend on the other signals representing other requests for operations that are present. It should be also noted that the logic of FIG. 6A is also responsive to formatting bit number 3 of the format shown on FIG. 2A and is identified as signal BIAI03+00 in FIG. 6A. It should be further noted that the format of FIG. 8B corresponds to the format 308 in multiplexer 301 of IOM 300. Accordingly, when a read cycle is requested by a source unit from a memory unit, the data bus is automatically reformatted by the invention as previously discussed in detail with respect to other types of examples.

Figure 9:
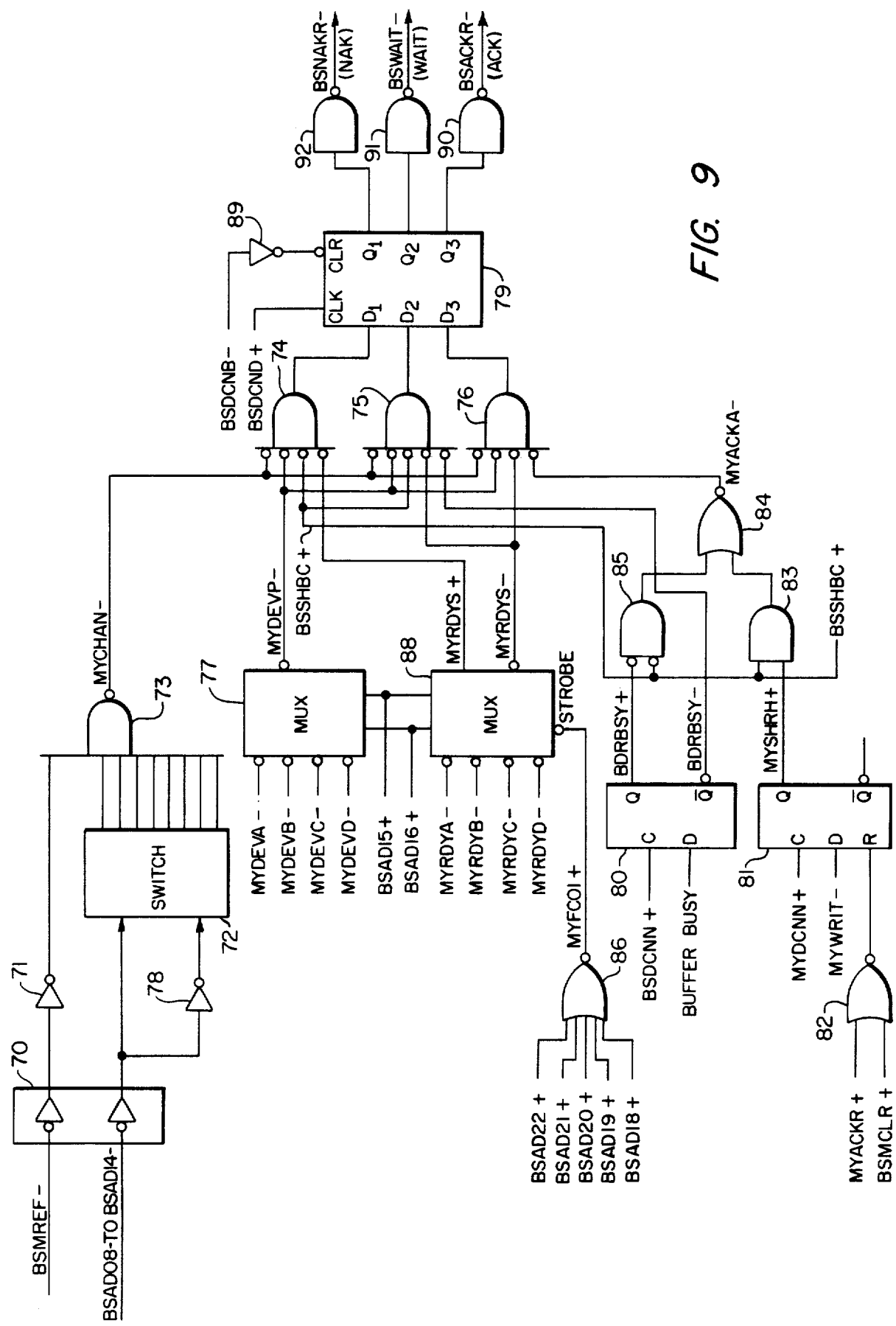
FIG. 9 illustrates the bus interface logic of a typical device controller coupled with the bus of the present invention.

Referring now to FIG. 9, there is shown a typical controller address logic. This logic is exemplary of controllers particularly those types having up to four subunits or peripheral devices connected thereto. Element 70 includes line receivers, one for the memory reference signal (BSMREF−), and the others, one each, for the bus addresses BSAD08− to BSAD14−. Because this logic in FIG. 9 is for a non-memory controller, a memory reference signal is a binary one, both at the input of element 70 and the output of inverter 71.

A switch 72 is coupled to receive the address leads as well as the invention thereof via inverters 78. This switch is located in most device controllers connected to the bus system 200 and is set to the address of the particular unit. The bus address leads at the input side of element 70 are binary zeroes for those bits which reflect the proper address of the desired unit. Accordingly, with the inversion provided by element 70, binary one signals are provided at the non-inverted inputs of switch 72 for those bits of the address which were received on the HNP bus system 200 as binary zeroes. Similarly, the output leads from the inverters 78 (there being as many inverters as there are leads) have binary ones for those positions in which the address bits are binary ones on the incoming address bits on the HNP bus system 200. With the signals at the two inputs of switch 72, the complements of each other, the switches therein which may be a hexadecimal switch or a plurality of toggle switches, more particularly a non-ganged seven pole two position switch, are set so that for the correct device address all binary one signals appear at the output terminals of switch 72. Thus, NAND gate 73 will receive all binary one signals and will provide a binary zero at its output if this is the proper device address and if this is not a memory cycle as shall be explained. It can be seen that the switch 72 is arranged so as to provide a comparator function and eliminates the need for at least one level of gating and accordingly the associated propagation delay therefor. Further, the switch provides an easy means for changing the address of a particular unit thereby simplifying the manner in which a system may be configured.

The output of NAND gate 73 is referred to as the MYCHAN− signal and will be a binary zero for the selected slave. The MYCHAN− signal is coupled to one input of each of the three negative AND gates 74, 75 and 76 and, as shall be seen, is utilized to generate the ACK, WAIT, or NAK signal. The other inputs to gates 74, 75 and 76 are received as follows.

Multiplexer 77 is coupled to receive four signals (although a greater or lesser number may be utilized) from respectively up to four subunits or peripheral devices connected with the particular controller logic as shown in FIG. 9. These signals received at the inputs of multiplexer 77 indicate, respectively, whether or not the particular subunit is present, i.e., installed in the system. That is, one or more of such subunits may be connected. If only one is so connected, the only one of such signals will indicate the presence of a subunit. These signals indicating that the subunits are present are indicated as the MYDEVA−, MYDEVB−, MYDEVC−, and MYDEVD− signals. Multiplexer 77 as well as multiplexer 88 to be hereinafter discussed may be that device manufactured by Texas Instruments having part number 74S151. The binary zero state of such signals indicates that the subunit is present in the system. The multiplexer 77 is enabled by the address signals BSAD15+ and BSAD16+ received from the HNP bus system 200 via inverting amplifiers or receivers not shown. The same two address signals are coupled to enable multiplexer 88. These two bits indicate which one of the, by way of illustration, up to four subunits or devices is being addressed. The output of multiplexer 77 is the MYDEVP− signal which, when a binary zero, indicates that the device addressed is present. Thus, each of the gates 74, 75 and 76 receive the output from multiplexer 77 and accordingly a response from a particular controller is governed by the presence of the controller's channel number and the fact that the controller actually has the subunit attached and present in the system. As shall be discussed hereinafter, this arrangement allows continuity in addresses between one subunit to the next in a manner to be more particularly discussed with reference to the memory address logic. In general, however, with more than one basic device controller 5-7 as shown in FIG. 2 in the system, and with each such controller 5-7 coupled to control different types of peripheral devices, or with all such controllers 5-7 coupled to control the same type of peripherals by selectively arranging such peripherals with the controller, the addresses for each such subunit or peripheral may be contiguous. Further, such addresses may be configured so that no matter how large or small the system a particular address may have any type of peripheral device associated therewith.

The other multiplexer 88 is coupled to receive indications from any one of the four subunits, for example, to indicate that in fact such subunit is ready to receive or send data. Thus, the ready signals received by multiplexer 88 are different from the presence signals received by multiplexer 77. Whereas the presence signals indicate whether or not the particular subunit or peripheral device is installed and present in the system, the ready signal indicates dynamically whether the associated subunit is ready and capable of sending data or receiving data. These ready signals are referred to as MYRDYA−, MYRDYB−, MYRDYC− and MYRDYD−.

The output of multiplexer 88 labelled MYRDYS−, when a logical zero, enables the generation of either a WAIT signal or the ACK signal depending upon the state of the other signals received at the gates 74, 75 and 76. If a binary zero is generated at the MYRDYS+ output of multiplexer 88, a NAK signal will be generated thus indicating that the addressed subunit is not in fact ready.

Gates 75 and 76 receive other signals, gate 75 receiving the BDRBSY— signal as shall be explained hereinafter and gate 76 receiving the MYACKA— signal from the output of gate 84. These two signals are explained with reference to the functions provided by flip-flops 80 and 81. In each controller, there is a buffer or register which accepts the data from the HNP bus system 200. If this data buffer is busy, that is, it already has information stored therein which cannot be lost, then there will to an indication that the buffer is busy and this will be received at the D input of D-type flip-flop 80, whose D input will be reflected at the Q output thereof upon receipt of the clock signal which in this case is the BSDCNN+ signal received via a driver from the bus. Thus, at the time the data cycle now signal, i.e., the BSDCNN— signal, goes to the binary zero state as shown in FIG. 5, if the buffer associated with this particular controller is in fact busy, then the Q output of flip-flop 80, i.e., the BDRBSY+ signal, will be a binary one which via negative AND gate 85 will be a binary zero. This binary zero state coupled to the input of NOR gate 84 will generate a binary one at its output, which will then inhibit gate 76 from generating an ACK signal. However, the Q̄ output of flip-flop 80, i.e., the BDRBSY— signal, will be a binary zero which will be provided at one input of gate 75 which, if all the inputs are binary zeroes, will generate a WAIT signal. Thus, if the buffer is not busy and other conditions exist, an ACK signal will be generated. If the buffer is busy, then either a WAIT signal or a NAK signal, depending upon the other conditions, will be generated.

The flip-flop 81 is used to indicate whether or not this is a second half read cycle operation. As discussed hereinbefore, the BSSHBC— signal is used by the master to indicate to the slave that this is the information previously requested. From the time a pair of devices coupled with the bus has started a read operation (indicated by RSWRIT—) until the second cycle occurs to complete the transfer (indicated by BSSHBC—), both devices may be busy to all other devices on the bus. Thus, looking at the inputs of flip-flop 81, the MYDCNN+ signal clocks the flip-flop, such signal coupled to and being the logical equivalent to the Q output of the grant flip-flop 22 of the device which has become the master. Received at the D input of flip-flop 81 is the MYWRIT— signal which means that this was the particular device which started the memory read cycle and that such device is now waiting to read from the memory and that such particular device is expecting a second half read cycle to be later generated by the memory as the memory completes the cycle.

The second half read cycle history flip-flop 81 has as its reset inputs the MYACKR+ and the BSMCLR+ signals, both coupled to the reset input via NOR gate 82. The BSMCLR+ signal acts to reset flip-flop 81 as discussed hereinbefore for various other flip-flops and the MYACKR+ signal indicates that the second half read cycle is complete. Thus, if the flip-flop 81 is set, this set condition is coupled from the Q output of flip-flop 81 to partially enable one input of AND gate 83. In order to fully enable AND gate 83, the BSSHBC+ signal must be generated by the memory, indicating that this is the information previously requested. Thus, with the data coming from memory via the bus, this signal is activated and via NOR gate 84 the negative going edge of the MYACKA— signal is generated which permits the particular device to acknowledge this bus cycle by the enabling of gate 76 and via element 79, generating the ACK signal via driver 90. In addition and as indicated hereinbefore, an ACK acknowledgement may also be generated if in fact this is not a second half bus cycle and the buffer is not busy. This indication is provided by gate 85 through gate 84 in order to generate the ACK signal.

Thus, if the particular controller is waiting for a bus cycle, having had its second half read history flip-flop 81 set, then only the receipt of a second half bus cycle signal (BSSHBC+) can be responded to for this particular device. If this particular device is not waiting for a second half bus cycle, then if the buffer is not busy, i.e., if there is no longer any useful information in such buffer, then an ACK signal may be generated.

In addition, the second half bus cycle signal (BSSHBC+) is received at one input of gate 74 as well as gate 75. When the second half read cycle flip-flop 81 has been set, the only output that can be obtained, if this is the correct channel number, etc. as indicated by the inputs at gate 76, is an ACK signal. This is independent of whether or not the buffer is busy as indicated by flip-flop 80. Thus, a NACK signal or a WAIT signal will be generated by gates 74 and 75 only if this is not a second half bus cycle signal, i.e., that the signal BSSHBC+ is a binary zero. In further explanation, a second half bus cycle received by the controller can come, only from the controller's point of view, from a memory; and when the memory is ready to return the data to the controller, neither a NAK nor a WAIT signal can be generated, but rather only an acknowledge signal can be generated. Thus, if the BSSHBC+ signal is a binary one, then neither the NAK nor the WAIT signal can be generated.

As indicated hereinbefore, when information is being transferred from the memory, the memory can never receive a NAK or WAIT signal. This is because of the inherent priority arrangement of the apparatus of the present invention. The memory is the highest priority device. If a unit has asked memory to send it information, then the unit can expect the information at some point in time. If the unit generates a WAIT or NAK signal to the memory, then because the memory is the highest priority device the memory could keep trying to gain access to the particular controller which requested the data transfer and could hang up the bus; i.e., it could, because the memory is the highest priority device, cause the bus to effectively disable further data transfers until the data is accepted by the particular controller which had previously asked for it. Thus, only an acknowledge signal can be made in response to a request from memory to accept data; a controller, however, is allowed to generate a NAK or WAIT signal to another controller or a central processor. In addition, a general rule is that if one controller requests information from a controller of higher priority, the requesting controller must be ready to accept the information, and accordingly must respond with an ACK signal.

With respect to the ready multiplexer 88, as indicated hereinbefore, if the device is not ready, then the NAK signal, other conditions being met, will be generated. The reason the NAK signal is generated rather than the WAIT signal is because of the fact that typically, if a controller such as controller 210 is busy, the terminal will be busy more than just a few microseconds; it will be busy for milliseconds. Thus, cycle time would be wasted if the indication to the master is that the master keep trying. Further, the indication should be that the requesting unit go on with data processing rather than unnecessarily using bus cycles thereby delaying the overall response of the system. All the requesting unit has to do is at its convenience retry the destination unit.

As indicated hereinbefore, the strobe input of multiplexer 88 receives a signal from gate 86 identified as the MYFC01+ signal. This signal is a combination of the function code of the signals received at the input of NOR gate 86, such control bit or function code shown specifically in 8C, and identified as bits 18 through 22 with bit 23 not used. Within these bits, the function code is indicated so that the various units connected to the bus may recognize certain codes and commands, as hereinbefore discussed.

In summary, the NAK signal (BSNAKR−) is generated via driver 92 from the respective D-type flip-flop of element 79, by the full enabling of gate 74, and when BSDCND+ signal clocks such flip-flop. Gate 74 is fully enabled when the channel number is received; the device address provides an indication that it is in fact installed, that such device is not ready and that this is not a second half bus cycle. The WAIT signal (BSWAIT−) is provided on the bus via driver 91 from its D-type flip-flop included in element 79 when gate 75 is fully enabled. Gate 75 is fully enabled when the channel number is received; the device address provides an indication that it is in fact installed and that it is in fact ready, that there is an indication that this is not a second half bus cycle and that the buffer is busy. The acknowledge (BSACKR−) signal is provided on the bus by means of driver 90 in response to the D-type flip-flop included in element 79 when gate 76 is fully enabled. Gate 76 is fully enabled when the correct channel number is received, an indication that the device address as installed is provided, that such device addressed is in fact ready and that the buffer is not busy. However, should a second half read cycle signal be received, then an ACK acknowledge signal will be generated independent of whether or not the buffer is busy or not. Each of the flip-flops in element 79 is cleared in response to the BSDCNB− signal received from the output of gate 26 shown in FIG. 8, via inverter 89.

Figure 10:
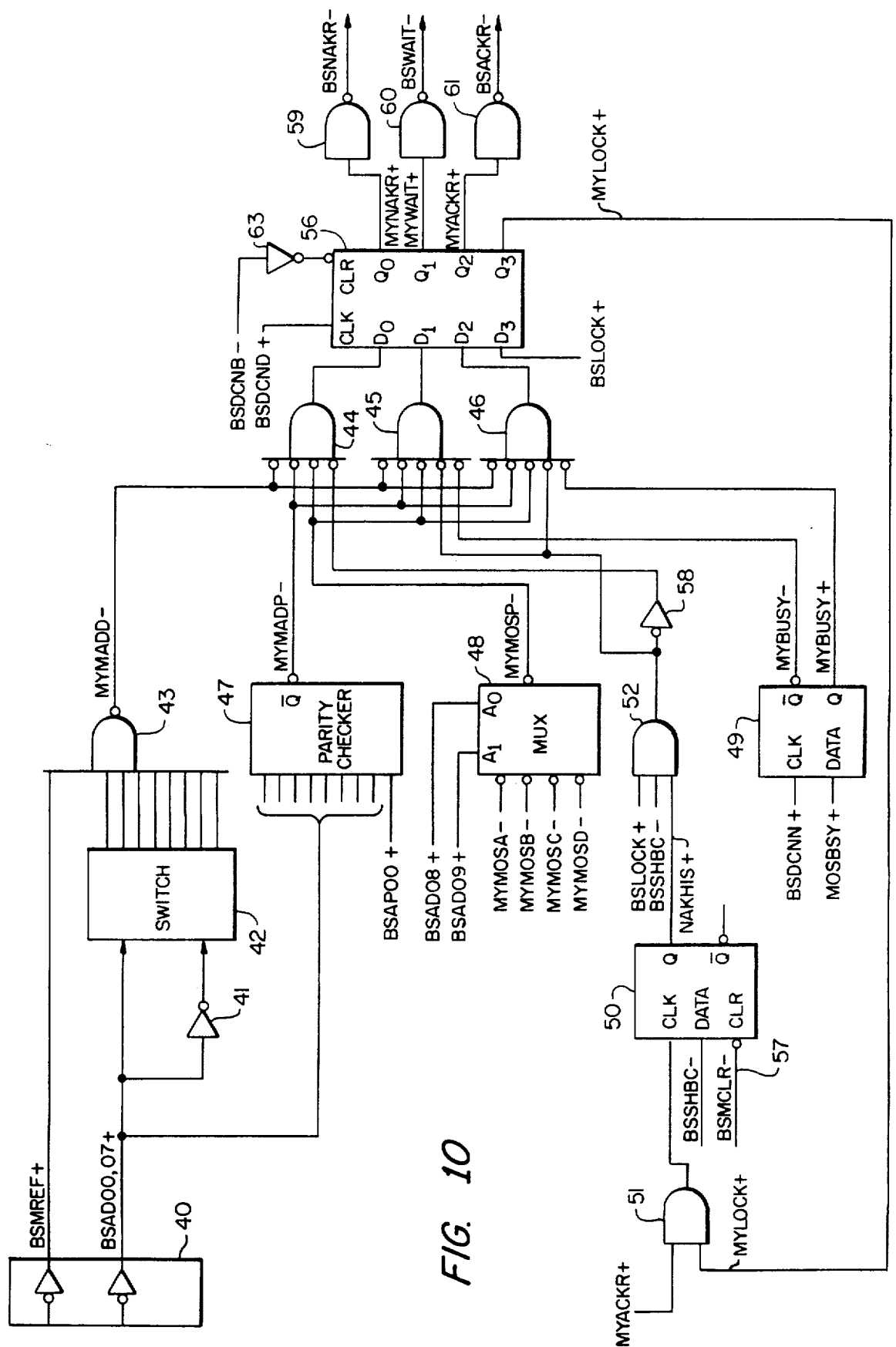
FIG. 10 illustrates bus interface logic of a typical memory controller coupled with the bus of the present invention.

Having described a typical controller's address logic such as controllers 5-7, typical address logic for a memory controller shall now be discussed. The memory controller logic of FIG. 10 is in many ways similar to the logic of FIG. 9. The address signal received by element 40 from the bus is transferred as the bus address signals BSAD00+ through BSAD07+ in the format shown in FIG. 8A. The address signals from receivers 40 are also received at the inputs of parity checker 47. The address signals from receiver 40 and also those at the output of inverters 41 are received by a switch 42 in the same manner as indicated for FIG. 9. If the memory reference signal (BSMREF+) is a binary one and the address compared by switch 42 generates all binary ones at the output of switch 42, then NAND gate 43 will be fully enabled to provide a binary zero signal on the MYMADD− line which is received at one input of each of the three negative AND gates 44, 45 and 46 which are utilized to generate the NAK, WAIT and ACK signals respectively. The memory cannot be addressed unless in fact the BSMREF+ signal is in the correct binary state.

As indicated, the addressed bits are received at the inputs of parity checker 47 which in addition receives the BSAP00+ bit which is the address parity received over the bus. Parity checker 47 makes a nine bit parity check and generates at its $\overline{Q}$ output a signal labelled MYMADP−, which if a binary zero partially enables the gates 44, 45 and 46, thereby indicating that the parity is correct.

A third input to the gates 44, 45 and 46 is received from the multiplexer 48 which is analogous to multiplexer 77 of FIG. 9. Multiplexer 48 receives, by way of example, four inputs labelled MYMOSA− through MYMOSD− which indicate whether or not any one or all of the memory modules connected to this particular controller are actually present in the system. This allows a memory to either have a full memory module array or allows it to have a partial array, that is, only one of such memory modules may be connected in the system. These four memory modules are further addressed, and via multiplexer 48 are tested to determine if they are installed by means of the two bus address signals BSAD08+ and BSAD09+.

Thus, for differently configured systems, there may be one memory module connected to one particular memory controller and there may be two such modules connected to another such controller; in fact, the different memory modules connected to the different controllers may be of different types. For example, in this manner a semiconductor memory may be connected to one controller whereas a magnetic core memory may be connected to another. Further, different size, i.e., more or less storage capacity, memory modules may be used. Further, by arranging the memory modules in different controllers, different speed memories may be used thereby increasing the speed of system response. Also, for any given controller there is normally only a given power support and timing capability and in the normal case, that controller establishes the personality of the memories that may connect to it. Accordingly, for example, if there are different types of memory speeds or different types of timing required such as, for example, between core and semiconductor memory, then a different controller must be utilized for each type. Further, by use of different controllers, the memories can be run faster since in fact they can be run essentially parallel in time with each other, even though they are connected to the same bus; however, only one transfer can take place at a time on a bus, the point being that the information will be read in the memory without any access time required since in fact the access time has already taken place.

As indicated hereinbefore, each controller whether it be for memory or another peripheral device generally has its own specific address. Thus, for different memory controllers having a full complement of memory modules connected thereto, contiguous memory addresses may be provided. More specifically, assuming that each memory controller has four memory modules coupled thereto, and that each such module has the capability of about 8,000 words of storage, then each such memory controller will be able to provide access to 32,000 words of storage. With a full 32,000 words of storage coupled in the system for each memory controller, the addresses of the memories are contiguous. From an operations point of view, contiguous memory address is important not only for purposes of system addressing, but also for increased response in the system. As mentioned before, typically the memory controller can only provide service for a memory of a certain characteristic, i.e., a magnetic core memory cannot be coupled to the same memory controller as a semiconductor memory because of the basic timing differences associated therewith. The same is normally true for memories of different speeds or power requirements. Thus, assuming again that each memory controller may provide service for 32,000 words of memory, if only 16,000 words of memory are to be used for low speed memory and another 16,000 words are to be used for high speed memory, this means that two memory controllers must be used. However this would typically mean that the memory addresses between the high speed and the low speed memories would not be contiguous because the memory controller addresses are 32,000 words apart. In this case, it is possible to provide contiguous memory addresses by allowing both of the memory controllers to have the same address. However, this would also mean that the respective memory module positions of the two controllers could not both be occupied in the same location in each such controller. More specifically, the first controller would utilize two 8,000 word storage locations in memory module positions A and B as indicated by the MYMOSA— and MYMOSB— signals. The other controller would utilize the other two memory module positions, the presence of which would be indicated by the MYMOSC— and MYMOSD— signals. Thus, these two controllers appear in the system as if they were one controller. By way of further example, one such controller may have simply 8,000 words of one such memory coupled therewith in the form of one module, whereas the other memory module with the same address may have coupled therewith up to three such memory modules in the other three positions to accordingly provide 24,000 words of memory storage. This arrangement need not necessarily be limited to different types of memories, but in fact may address the problem of defective memory modules coupled with a controller. For example, a redundant memory module may be provided coupled with another controller whose device address may be set as may be appropriate upon detection of a failure in such memory module.

Referring again to the enabling of gates 44, 45 and 46, each of such gates in order to be enabled and allow a response from this particular memory controller must receive its memory controller's address, an indication that the module addressed exists in the system, and that the address parity is correct, as indicated by parity checker 47. The other inputs to the negative AND gates are serviced from a combination of busy logic and lock history logic as presently described.

The memory controller busy signal is provided by flip-flop 49 and indicates that any one of the memory modules connected to this controller is in fact busy. This D-type flip-flop 49 is clocked by the BSDCNN+ signal. If a memory module is busy, then a WAIT signal will be generated. Thus, if the MYBUSY— signal at the Q̄ output of flip-flop 49 is a binary zero, this enables, if the other conditions are met, gate 45 to be fully enabled and to set the associated flip-flop in element 56, it being noted that this is done when the BSDCND+ signal is received at the clock input of element 56. At this point, it is noted that this flip-flop element 56 is cleared via inverter 63 when the BSDCNB— signal is received as was the operation for element 79 of FIG. 9. The acknowledge signal will be generated when a binary zero is generated at the Q output of flip-flop 49 as indicated by the MYBUSY+ signal coupled to one input of gate 46. It is again noted that the WAIT signal means that there will be a very short delay since the memory is still busy.

The other condition which indicates which of the ACK, NAK or WAIT signals is to be generated is the lock signal which as indicated hereinbefore comprises a multi-cycle bus transfer whereby a device can access a specific memory location without any other locked unit being able to break into the operation. The effect of this locked operation is to extend the busy condition of the memory controller beyond the completion of a single cycle for certain kinds of operations. Devices attempting to initiate a lock operation before the last cycle of the sequence is complete will receive a NAK signal. The memory will, however, still respond to a memory request as shall be presently explained. It is noted that the intervening time between these cycles may be used by other units not involved in the transfer. A locked operation is used primarily where it is desirable for two or more units or devices to share the same resource such as memory, for example. The locked operation which can include any number of bus cycles is unlocked by the particular unit or device which has had control of the shared resource. While the shared resource is locked, other units desiring to access the shared resource will be locked out if such other units present the lock control signal. If the lock control signal is not presented, it is possible for such other unit to gain access to the shared resource such as, for example, to process an urgent request or procedure. Before any unit presenting the lock control signal gains access to the shared resource, it tests the resource to see whether it is involved in a locked operator and then during the same bus cycle, if the resource is not involved in a locked operation, it may gain access to the resource.

Thus, it can be seen that the locked operation for sharing a resource is one that is effective between those units which issue the appropriate controls, i.e. the lock control signal, and may be used, for example, in sharing a portion of memory in which a table of information may be stored. Further, if one of the units desires to change information in the shared resource, other units may be locked out so that they do not gain access to only partially changed information, but rather are allowed access only after all such changes have been made. A read modify write operation may be involved in such case. By use of the locked operation, it can be seen that a multiprocessing system may be supported. For example, with two central processing units connected to the same bus system 200, both may share the memory units connected to the bus without interference if the locked operation is used.

It is noted that the BSSHBC— signal for the locked operation, as shall be seen, is used in a somewhat different manner than has been heretofore discussed. During the locked operation, the BSSHBC— signal is issued by the unit attempting to share a resource both to gain access to the shared resource by means of a test and lock procedure and to unlock the shared resource when it has completed its locked operation.

Thus, as can be seen by FIG. 10, a lock history flip-flop 50 is provided, which if set, indicates that a locked operation is in process, thereby enabling a NAK signal to be issued to a requesting unit via driver 59. Assuming that the logic of FIG. 10 represents the bus system 200 interface logic for the shared resource, the BSLOCK+ signal (binary one state) is received by both AND gate 52 and flip-flop D3 of element 56. Element 56 thereby generates the NYLOCK+ signal which is received at one input of AND gate 51. If the lock history flip-flop is not set, the NAKHIS+ signal will be a binary zero, thereby independent of the state of the other two inputs to gate 52, generating a binary zero at one input of gate 46. If all inputs of gate 46 receive a binary zero, thereby indicating that the current address for this unit and device were received, and that the common element or buffer is not busy, then an ACK signal will be generated via element 56 and driver 61 in response to the BSLOCK+ signal. The ACK signal will fully enable AND gate 51 to set the history flip-flop 50 in response to the binary one state of the BSSHBC− signal at the D input thereof which is received with the binary one state of the BSLOCK+ signal at the commencement of the locked operation. Thus, a test and lock operation is performed during the same bus cycle.

If flip-flop 50 had already been net at the time of the receipt of the binary one state of the BSLOCK+ and BSSHBC− signals, then a binary one signal will be generated at the output of AND gate 52 thereby generating a binary zero state at the output of inverter 58 so as to enable AND gate 44, all other conditions having been met, to generate the NAK signal. Thus, the test and lock operation would have produced a NAK response inhibiting another unit from using the shared resource.

Once the unit using the shared resource is through with its operation, it must unlock the resource. This is done by receipt from the user unit of the binary one state of the BSLOCK+ signal and the binary zero state of the BSSHBC− signal. This enables the logic of FIG. 10 to provide an ACK response, enabling gate 51 and thereby effectively resetting history flip-flop 50 because of the binary zero state of the BSSHBC− signal. The shared resource is now free to make an ACK response to other units.

It can be seen that the shared resource will only lock out other units which present the binary one state of the BSLOCK+ signal. If a unit, for example, desires to gain access to a shared resource which had its history flip-flop set so that the NAKHIS+ signal is a binary one, then, if the BSLOCK+ signal is a binary zero, the output of AND gate 52 will be a binary zero, thereby disabling a NAK response and enabling, dependent upon other conditions, either a WAIT or ACK response. Thus, a unit may gain access to a shared resource even though it is involved in a locked operation.

Thus, it can be seen that the generation of a WAIT signal from any one of the controllers allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one of three responses, either the NAK, WAIT or ACK signal. At the end of any one of these responses, a new priority net cycle occurs and this particular device gains access to the bus or another higher priority device wins the bus. It should be understood at this point that signal states on the bus are the inverse in binary state to those signals shown internal to the units. For example, the memory reference signal is referred to on the bus between, for example, drivers 59, 60 or 61 and receivers 40 to be in one state and in the opposite state in the controllers themselves. Further, as indicated hereinbefore, a fourth response between any of the controllers connected on the bus is that there is no response at all. Thus, if one of the masters is calling for service from the memory and this memory is not installed in the system, a time out element, well known in the art, will generate a signal after a certain period of time such as, for example, five microseconds, thereby generating a NAK signal. At that point, a central processor may take action such as by an interrupt or trap routine.

Referring again to the operation of the memory busy flip-flop 49, the data input is coupled to receive the MOSBSY+ signal which is asynchronous to the bus operation. This signal may be received at any time regardless of the operation which is occurring on the bus for any controller. When the BSDCNN+ signal is received from the master at the clock input of flip-flop 49, a history is stored as to the state of the memory, i.e., whether it is busy or not at that time. Thus, this eliminates confusion in the response to the bus cycle. Without the history retention provided by flip-flop 49, it would be possible to start cut the bus cycle in a WAIT condition and end up the same bus cycle in the state which generates an ACK condition. Thus, both responses would be made during the same bus cycle which would thus be an error condition. By use of history flip-flop 49, the response is fixed as to the condition which the controller was in at the time the BSDCNN+ signal is received, thereby allowing an asynchronous response and regardless of the tolerance or difference in memory speed.

Figure 11:
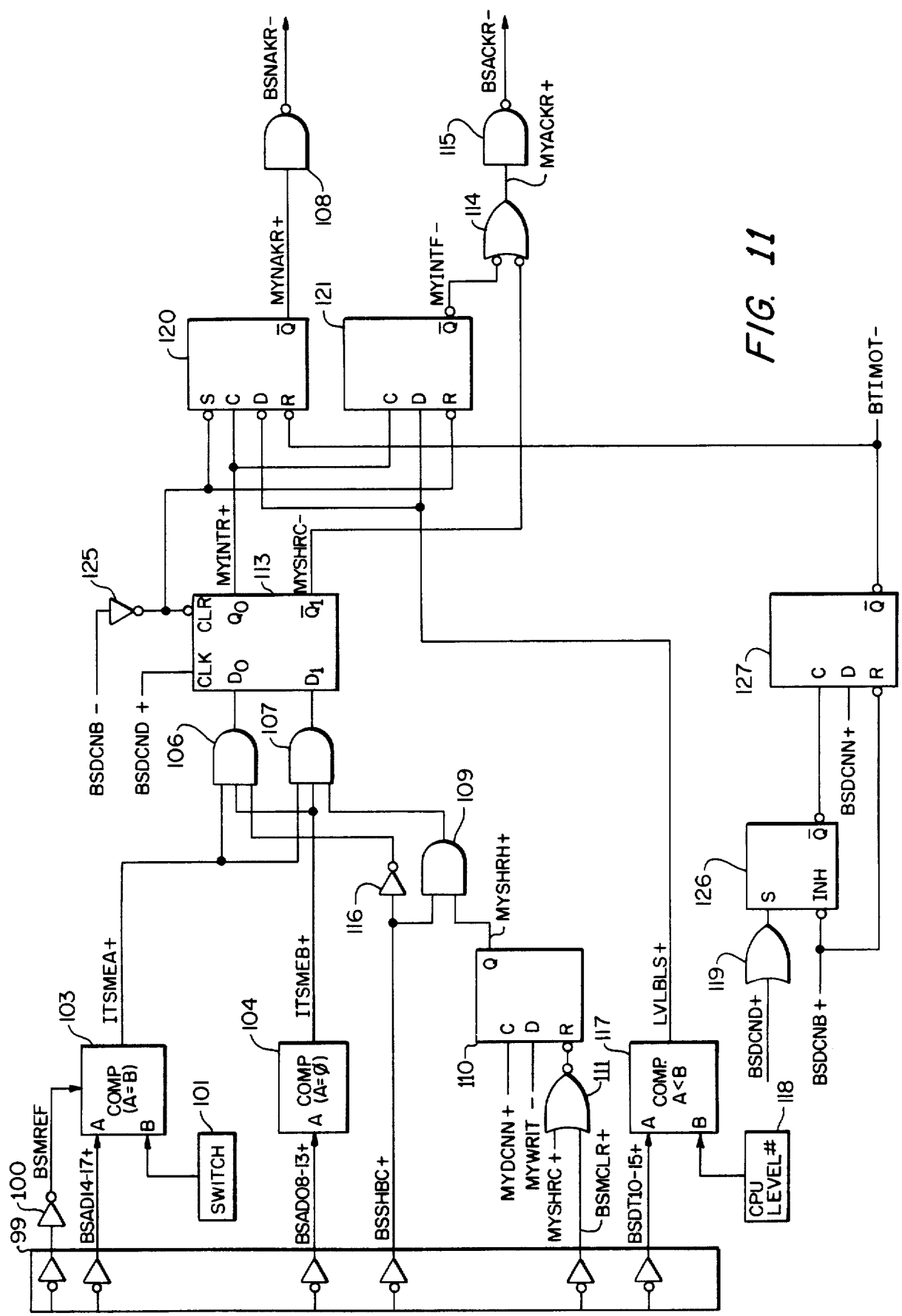
FIG. 11 is a logic block diagram illustrating interface logic coupled with the bus system of the present invention.

Now referring to the typical central processor bus coupling logic of FIG. 11, the signals are received from the bus by means of the receivers included in element 99. The memory reference signal BSMREF− is received by one of such receivers and inverted by means of inverter 100 and provided to one input of comparator 103 so as to enable such comparator if the address being received is not a memory address. One of the inputs for comparison by comparator 103 is the data processor address bits which in this case by way of example are four in number and are indicated as the BSAD14+ through BSAD17+ signals. This address received at one input of comparator 103 is compared with the address set by, for example, the hexadecimal switch 101 in the data processor itself. When the received address and the switch 101 provided address are compared and found to be equal, then comparator 103 generates an ITSMEA+ signal which partially enables gates 106 and 107.

Further address bits BSAD08+ through BSAD13+ are received at the inputs of comparator 104 which determines whether or not these bits are all zeroes. If they are all zeroes, then the ITSMEB+ signal is generated to also partially enable gates 106 and 107. Enabling of further inputs of either gate 106 or 107 will effectively set a respective flip-flop in element 113.

The other input to gate 106 is a second half bus cycle BSSHBC+ signal which is coupled to gate 106 via inverter 116. The second half bus cycle is also received at one input of AND gate 109. The other input to gate 109 is from the Q output of the second half read history flip-flop 110. The second half read history flip-flop is utilized to remember that the data processor issued its MYDCNN+ signal, i.e., the setting of this device's grant flip-flop 22, and that the central processor also sent the signal entitled MYWRIT−, which implies that the data processor is expecting a response cycle from the slave. Thus, with such a two cycle operation, the second such cycle presents the expected data to the central processor, and the flip-flop 110 will identify this data as being that which the central processor requested by the fact that the history flip-flop 110 has generated the MYSHPH+ signal at the O output thereof. Flip-flop 110 is reset via NOR gate 111 if the bus clear signal BSMCLR+ is received or if the second half bus cycle has been completed as indicated by the MYSHRC+ signal. The MYSHRC+ signal is derived from one of the outputs of element 113 to be hereinafter discussed.

Thus, AND gate 107 will be fully enabled if two of the inputs thereto indicate that this is the addressed device and that from the other input thereof that there has been a second half bus cycle as indicated via AND gate 109 from history flip-flop 110. Thus, by the enabling of AND gate 107 the MYSHRC— signal will be generated and will be coupled to one input of NOR gate 114. NOR gate 114 will provide an ACK signal (BSACKR—) via driver 115.

Gate 106 will be fully enabled when the proper unit address is received and if this is not a second half bus cycle, which thereby generates a positive pulse labelled as the MYINTR+ signal at the output of the respective flip-flop included in element 113. The MYINTR+ signal causes the logic of FIG. 11 to determine whether or not an ACK or a NAK signal will be generated. Which one of such signals is generated will depend on the interrupt level that is presently operating in the system as compared to the interrupt level of the device seeking processing time.

This decision regarding whether or not the interrupt level is sufficient is determined by means of comparator 117, which is a comparator for determining whether or not the A input is less than the B input. The A input of comparator 117 receives the BSDT10+ through BSDT15+ signals, is a not; the interrupt level of the device coupled with the bus which is seeking data processing time. There are a plurality of interrupt levels provided in the system. Interrupt number level 0 receives the highest possible accessibility to data processing time and accordingly is non-interruptable. Thus, the lower the interrupt level number, the less chance there is that such device's on-going processing will be interrupted. Thus, if the level number received at the A input of comparator 115 is less than the current level operating in the data processor as indicated by the level number in block 118, then the device seeking to interrupt as indicated by the signal received at input A will in fact be able to do so. If the A input is equal or greater than the B input, then the LVLBLS+ signal will not be generated and a NAK signal will be provided by the driver 108 and flip-flop 120 as shall be hereinafter described.

Thus, if the interrupt level received at input A of comparator 117 is less than that received at input B, the LVLBLS+ signal will be a binary one and will be coupled to the D input of both flip-flops 120 and 121, it being noted that the D input of flip-flop 120 is an inversion. If the A signal is equal to or greater than the B signal as indicated by comparator 117, then a binary zero signal will be generated for the LVLBLS+ signal which will be received at the negation input of flip-flop 120. This will generate the NAK signal if the MYINTR+ signal is received at the clock input of flip-flop 120 by the setting of the respective flip-flop in element 113. If the level was sufficient, i.e. if the A input was less than the B input as indicated by comparator 117, then a binary one will be generated at the LVLBLS+ signal and accordingly the MYINTR+ signal will clock this to the Q output of flip-flop 121 into one input of NOR gate 114 which via driver 115 will generate the ACK signal. Thus, if the MYNAKR+ signal is a binary one, then the NAK signal will be generated and if the MYINTF— signal is a binary zero, an ACK signal will be generated. The flip-flops in element 113 are clocked and cleared by inverter 125 in the same manner as previously discussed for similar flip-flop type elements. It should be noted that an ACK signal will be generated independent of the indication by comparator 117, if in fact this is the second part of the second half bus cycle. In such event, the MYSHRC— signal in one of the flip-flops of element 113 is coupled in the binary zero state to the other input of NOR gate 114 so as to generate the ACK signal thereby overriding any indication from flip-flop 121.

As indicated hereinbefore, the BSDCNB— signal via inverter 125 resets flip-flop 121 and in addition sets flip-flop 120, thereby initializing the flip-flops following the bus cycle. In addition, flip-flop 120 is reset by the logic associated with flip-flop 127 which generates a BTIMOT— signal indicating a time out condition, i.e., that a nonexistent device was addressed and that in fact no response, either a NAK, an ACK or a WAIT, has been generated by any potential slave device. Accordingly, there is provided a one-shot multivibrator 126 which may be set to have a five microsecond period, for example. This multivibrator 126 is triggered by the receipt of the BSDCND+ signal, i.e., the strobe signal, which is received at the input of buffer 119. Since the timing of the multivibrator 126 is in motion, if a BSDCNB+ signal is not received which signal indicates the end of the bus cycle, then after the period set by multivibrator 126 the BTIMOT— signal is generated at the Q output of flip-flop 127 via the clocking of the BSDCNN+ signal received at the D input of flip-flop 127, it being noted that the BSDCNN+ signal indicates that the bus cycle is still in process. The BTIMOT— signal operates on flip-flop 120 to generate a NAK signal. If on the other hand, the BSDCNB+ signal terminates before the end of the period set by multivibrator 126, the timing of multivibrator 126 is terminated and flip-flop 127 is prevented from generating the signal BTIMOT—.

It should be noted that the data processor logic in FIG. 11 generates either a NAK or ACK signal; however, a WAIT signal is not so generated by the data processor logic. The reason for this is that the data processor always has the lowest priority and accordingly, if it generates a WAIT signal, the other devices generating their requests to the data processor for service will possibly experience a hang-up on the bus if, for example, a higher priority device was the master to which the central processor responded with a WAIT signal. Thus, just because the higher priority device is waiting for the lowest priority device, i.e., the central processor, other devices will be disabled from using the bus.

In further explanation of the present invention, it can be seen that the integrity of information transferred over the bus may be insured without the necessity of adding a parity bit for each byte of information transferred on the bus. This integrity may be provided for any units which transfer information therebetween. More particularly, this may be facilitated in those cases where a master unit in its request expects a response from a slave unit. Thus, the integrity of such data transfers may be best facilitated in those situations where two bus cycles are utilized in a bilateral bus transfer. This is particularly advantageous, for example, in a memory read operation wherein the master requests information from the memory and, during a later bus cycle, receives such information. It has been found, for example, that a substantial number of data transfers occur between the memory and another device during a read operation which requires two bus cycles and accordingly the data integrity feature of the invention is particularly important in such case.

Basically, the integrity apparatus takes advantage of the fact that when a master addresses another unit which may be, for example, a memory or a tape or disk peripheral unit, for information the master places the address of the slave unit on the address leads on the bus and its own address and function code on the data leads of the bus. When the slave responds and in so responding is the master, the slave then places the requesting unit's address on the address leads and the data on the data leads. Thus, the requesting unit's address is received back on address leads as opposed to the transfer thereof initially on the data leads. The requesting device then compares its address, i.e., its addresses transferred on the data leads, with the address now received on the address leads, and if they compare, this insures that in fact at least its device address was received properly by the slave and that in addition, if the opcode is also received back, the opcode was received satisfactorily. Thus, for sixteen bits of information as shown in the format of FIG. 4, up to two parity bits are eliminated while maintaining the integrity of the data transfers in the system.

While the invention has been particularly shown and described with reference to a preferred embodiment thereof, it will be understood by those skilled in the art that changes in form and details may be made therein without departing from the spirit and scope of the invention.

What is claimed is:

1. In a computing system having at least one main memory, one central processing unit, and a plurality of input/output devices, apparatus for transferring information including format control signals, between said units comprising, in combination:

a first electrical bus coupled to transfer information as parallel bits including said format control signals to and from each of said plurality of input/output devices and between any two of said plurality of input/output devices;

a second electrical bus coupled to transfer information as parallel bits including said format control signals to and from either said main memory or said central processing unit and between said main memory and said central processing unit; and formatting means having a single input/output port connected to said first and second electrical buses, said formatting means controlling the bidirectional transfer of information between one of said plurality of input/output devices and either said main memory or said central processing unit and including decoding logic circuitry responsive to said format control signals, received from the second electrical bus, including a predetermined format control signal in a first state to generate a first set of predetermined selection signals, said formatting means further comprising a plurality of multiplexer circuits, each associated with a bit of the first electrical bus, responsive to said first set of said predetermined selection signals and to the parallel bits on the second electrical bus to change the format of information passing from either said central processing unit or said main memory through said second electrical bus to said one of said plurality of input/output devices through said first electrical bus, said format being selected from a first of a plurality of formats determined by said format control signals, said decoding logic circuitry responsive to said format control signals, received from the second electric bus, including said predetermined format control signal in a second state to generate a second set of predetermined selection signals, said multiplexer circuits being responsive to said second set of said predetermined selection signals and to the parallel bits on the second electrical bus to change the format of information passing from either said central processing unit or said main memory through said second electrical bus to said one of said plurality of said input/output devices through said first electrical bus, said format being selected from a second of said plurality of formats determined by said format control signals.

2. In a computing system having at least one main memory, one central processing unit, and a plurality of input/output devices, apparatus for transferring information, including format control signals, between said units comprising, in combination:

a first electrical bus coupled to transfer information as parallel bits including said format control signals to and from each of said plurality of input/output devices;

a second electrical bus coupled to transfer information as parallel bits including said format control signals to and from either said main memory or said central processing unit; and formatting means having a single input/output port connected to said first and second electrical buses, said formatting means controlling the bidirectional transfer of information between one of said plurality of input/output devices and either said main memory or said central processing unit and including decoding logic circuitry responsive to said format control signals, received from the first electrical bus, including a first of said format control signals in a first state indicative of a read from memory operation to generate a first set of predetermined selection signals, said formatting means further comprising a plurality of multiplexer circuits, each associated with a bit of the second electrical bus, responsive to said first set of predetermined selection signals and to the parallel bits on the first electrical bus to change the format of information passing from said one of said plurality of input/output devices through the first electrical bus to either said main memory or said central processing unit through the second electrical bus, said format being selected from a first of a plurality of formats, said decoding logic circuitry being responsive to said format control signals including a predetermined format control signal in a first state and said first of said format control signals in a second state indicative of a write into memory operation to generate a second set of predetermined selection signals, said multiplexer circuits being responsive to said second set of predetermined selection signals and to the parallel bits on the first electrical bus to change the format of information passing from said one of said plurality of input/output devices through the first electrical bus to either said main memory or said central processing unit through the second electrical bus, said format being selected from a second of a plurality of formats determined by said format control signals, and said decoding logic circuitry being responsive to said format control signals including said predetermined format control signal in a second state and said first of said format control signals in a second state indicative of a write into memory operation to generate a third set of predetermined selection signals, said multiplexer circuits being responsive to said third set of predetermined selection signals and to the parallel bits on the first electrical bus to change the format of information passing from said one of said plurality of input/output devices through the first electrical bus to either said main memory or said central processing unit through the second electrical bus, said format being selected from a third of a plurality of formats determined by said format controls signals.

3. In a computing system having at least one main memory, one central processing unit, and a plurality of input/output devices, apparatus for transferring information, including format control signals, between said units comprising, in combination:

a first electrical bus coupled to transfer information as parallel bits including said format control signals to and from said input/output devices;

a second electrical bus coupled to transfer information as parallel bits including said format control signals to and from either said main memory or said central processing unit; and formatting means having a single input/output port connected to said first and second electrical buses, said formatting means controlling the transfer of information between said input/output devices and either said main memory or central processing unit and including decoding means responsive to said format control signals received from either the first or second electrical bus to generate a plurality of predetermined selection signals and means responsive to the predetermined selection signals and to the parallel bits on the electrical bus to change the format of information passing to or from either said central processing unit or said main memory through the second electrical bus from or to a selected one of said input/output devices through the first electrical bus, said format being selected in accordance with said format control signals from one of a plurality of different formats applicable to said input/output devices, central processing unit or main memory.

4. The computing system of claims 1, 2, or 3 wherein said formatting means has a single output port connected to said first and second electrical buses.

5. The computing system of claim 4 wherein said formatting means including a plurality of multiplexers has a single path for data to flow from said input port through said plurality of multiplexers to said output port.

* * * * *